United States Patent [19]
Moiroux

[11] 3,809,030
[45] May 7, 1974

[54] INTERNAL COMBUSTION ENGINES

[76] Inventor: Auguste Moiroux, 28 Route de Dardilly, Ecully, France

[22] Filed: Jan. 18, 1972

[21] Appl. No.: 218,810

[30] Foreign Application Priority Data
Jan. 18, 1971 France .............................. 71.02414
Jan. 13, 1971 France .............................. 72.01818

[52] U.S. Cl. ........ 123/32 K, 123/33 VC, 123/32 B, 123/32 C, 123/32 AA
[51] Int. Cl. .......................... F02b 19/02, F02b 3/12
[58] Field of Search .......... 123/33 VC, 32 K, 33 D, 123/32 L; 60/39.6

[56] References Cited
UNITED STATES PATENTS
3,580,231  5/1971  Bradbury ........................ 123/33 VC
1,653,825  12/1927  Saives ................................... 123/33
2,503,186  4/1950  Ziegler .................................. 123/33

FOREIGN PATENTS OR APPLICATIONS
402,308  11/1933  Great Britain ..................... 123/32.9
781,797  5/1935  France .............................. 123/32.9
483,763  8/1927  Germany .......................... 123/32.9

*Primary Examiner*—Laurence M. Goodridge
*Assistant Examiner*—Ronald B. Cox
*Attorney, Agent, or Firm*—Weiner, Basile and Weintraub

[57] ABSTRACT

Internal combustion engine which may be of the reciprocating piston type or rotary type in which there is a separate combustion chamber communicating through a valve with a compression and expansion chamber which may be constituted by a cylinder or stator casing of a rotary engine.

16 Claims, 12 Drawing Figures

INTERNAL COMBUSTION ENGINES

This invention relates to internal combustion engines and particularly to combustion chambers therefor.

For some years certain internal combustion piston engines have been provided with separate combustion chambers. In these engines, certain cylinders are used in the manner of an air-compressor in order to supply separate combustion chambers, while other cylinders are used as low pressure or expansion cylinders for the burnt gases emanating from the combustion chambers. In such engines, each compression cylinder is separated from the corresponding combustion chamber by a delivery valve, the combustion chamber having a transfer valve allowing communication with the corresponding low-pressure or expansion cylinder. From this known arrangement different engine components have different thermal functions. For example, certain cylinders deal only with air, while others receive only hot gases; the delivery valves allow only the passage of compressed air while the transfer valves throttle the burnt gases. These factors lead to technological complications and make it necessary to limit the temperatures and the pressure of the various components, i.e., the power and efficiency of the engine.

It is an object of the present invention to obviate or mitigate these disadvantages by producing an engine having a separate combustion chamber of excellent efficiency and robust construction, and which facilitates the desideratum of a low pollution engine.

An internal combustion engine according to the invention comprises at least one separate combustion chamber connected to at least one compression and expansion chamber for the engine fluid and a valve for permitting communication between the compression and expansion chamber and the combustion chamber.

The separate combustion chamber may have reverse circulation.

Another feature of the invention consists in using for the engine fluid, a volumetric ratio of expansion greater than the volumetric ratio of compression.

The combined use of the aforementioned arrangements ensures an acceptable thermal charge despite the permanence of hot fluid in the combustion chamber, and an advantageous output despite the limited temperature of this hot fluid.

The combustion chamber according to the invention makes it possible to control very accurately engine combustion of long duration. For this reason, the invention is directed particularly towards the suppression of pollutant exhaust gases, since this permanent combustion, at limited temperature, is able to use gaseous fuels at average pressure. These fuels which can be liquefied at normal pressures and temperatures can be stored under conditions comparable to liquid fuels and due to this are particularly advantageous for use in vehicle engines.

The combustion chamber may be given a substantially spherical internal configuration with the exception of an inner boss providing a central guide bore for the stem of a communicating valve engaging in a fluid-tight manner on an annular seat defining, opposite the central boss, the communicating port of the separate combustion chamber and of the cylinder or other compression chamber of the engine.

The opening of the valve is effected by moving inwardly of the combustion chamber relative to its fixed annular seat.

A fuel injector opens into the combustion chamber opposite the valve seat, near to the base of the central boss, the axis of the injector being inclined towards the axis of the valve in the direction of the center of the seat.

The seat of the valve is preferably constituted by an annular part comprising two concentric and superimposed annular zones, namely a first air-tight zone for the abutment of a tulip-shaped part of the valve and a second turbulence zone which comprises channels opening tangentially towards the inside of the chamber.

The communicating valve is preferably controlled by a double-lift mechanism which effects, at the instant of the intake of fresh air towards the interior of the chamber, a lift placing the tulip-shaped part of the valve above the air-tight zone, but inside the turbulence zone of the seat, the lift of the valve being greater at the time of the ejection of the gases from the combustion chamber, this second lift placing the tulip-shaped part of the valve above the turbulence zone of the seat.

Embodiments of the present invention will now be described, by way of example, with reference to the accompanyings, in which.

Figure 1:
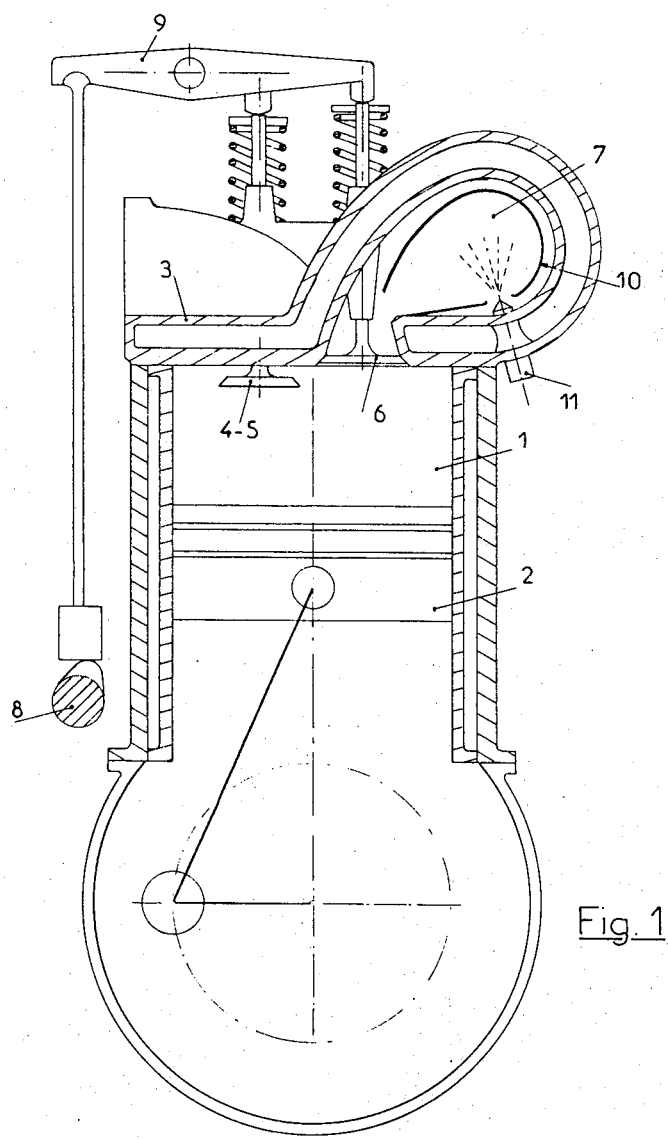
FIG. 1 is an axial section of a two-stroke reciprocating piston, internal combustion engine having a separate combustion chamber according to the invention.

FIG. 1 shows a two-stroke reciprocating piston engine, the fluid distribution of which is entirely effected by valves. The engine comprises a cylinder 1 in which a piston 2 slides. The cylinder head 3 mounts an inlet valve 4 and exhaust valve 5 which are located outside the plane of the drawing section but have no special feature other than providing the necessary arrangement for producing satisfactory scavenging. In addition, the cylinder head is provided with a single valve 6 for allowing communication with a combustion chamber 7. There is only one combustion chamber per engine. All the valves are controlled by the single cam shaft 8 and the customary push-rod and rocker 9. The combustion chamber 7 has walls cooled by circulating engine water and an inner sleeve 10 of refractory steel which channels the air delivered through the valve 6 in order to make it follow the walls of the chamber and supply the tip of a fuel injector 11. This injector may either be of the continuous injection type (in this case it is supplied by a constant pressure pump and its opening is controlled by the vehicle acceleration control and limited by a speedometer abutment), or of the impulse or jet type (in this case, it is supplied by a standard injection pump controlled by the vehicle acceleration control).

There may be one or more fuel injectors per combustion chamber. The structure of the engine must take into account the low maximum pressures and discover the subsequent reduction in weight in the moving parts, which makes it possible to increase the maximum speed.

Figure 2:
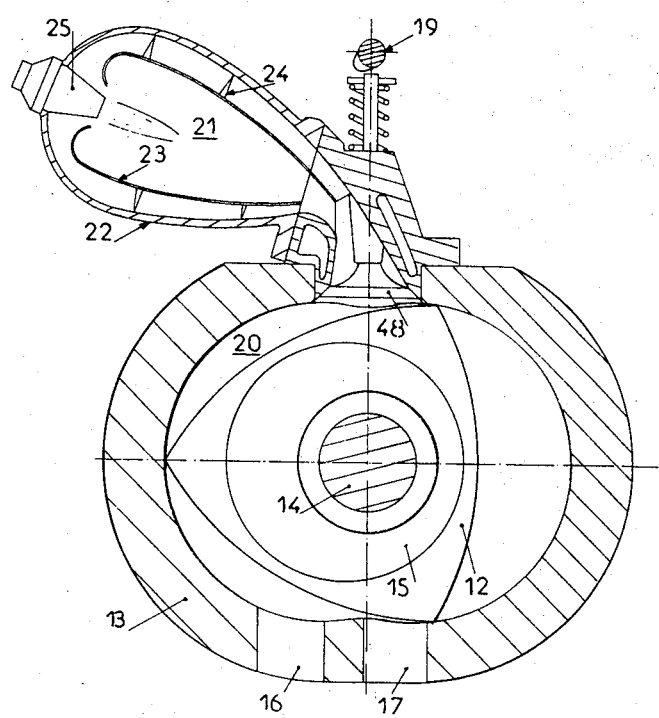
FIG. 2 is a section of a four-stroke rotary-piston engine having a separate combustion chamber according to the invention.

FIG. 2 shows a four-stroke Wankel rotary engine provided with a similar combustion chamber.

The rotor 12 moves in the stator 13 on the shaft 14 provided with the eccentric 15. The inlet channel 16 and exhaust channel 17 occupy a particular position which will be discussed later.

The valve 18 controlled by the cam shaft 19 permits communication between the work area 20 of the stator chamber and a combustion chamber 21. This chamber 21 comprises a body 22 and an inner sleeve 23 provided with outer guide channels 24. The gaseous fuel is injected by the fuel injector device 25 regulated by the vehicle accelerator control and limited by a speedometer device.

The operation of the engines of FIGS. 1 and 2 is practically the same.

Figure 3:
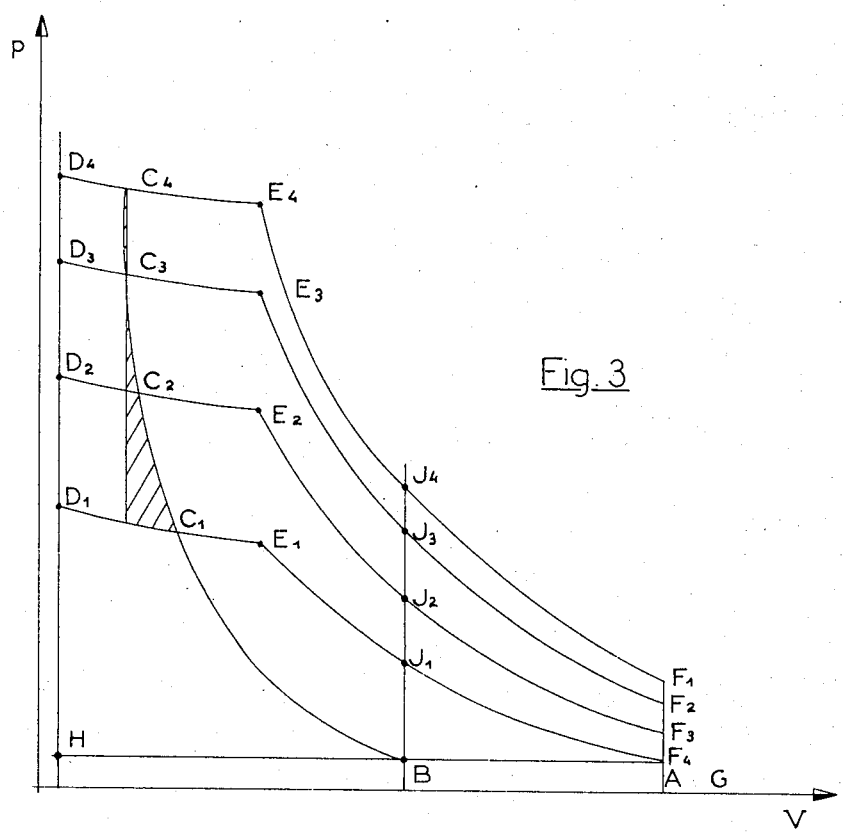
FIG. 3 shows pressure/volume diagrams illustrating the operating characteristics of an engine according to the invention.

FIG. 3 shows the PV diagrams obtained. At the beginning of the cycle (point A), a certain delay in the closure of the air inlet occurs. This takes place, either by displacing the control noses on the cam shaft 8 in the case of reciprocating piston engines (FIG. 1) or by displacing in the direction of rotation of the rotor 12 the inlet channel 16 in the case of the Wankel engine of FIG. 2. Thus, from point A to point B there is no compression the air inlet remaining open.

At point B, the air inlet closes and compression occurs until point C, selected because the pressure in the compression chamber (1 and 20) is identical to that in the combustion chamber (7 and 21). The communicating valve (6 and 18) between the compression chamber (1 and 20) and the combustion chamber opens (7 and 21) and the piston 2 or the rotor 12 compresses the air in the entire volume of the communicating compression chamber (1 and 20) and combustion chamber (7 and 21) until upper dead center C D is attained. As the dead space of the compression chamber is very small since no combustion requirement is imposed on it, any air is transferred from the compression chamber into the combustion chamber. The engine cycle continues by commencing expansion; there follows a filling of the expansion chamber (1 and 20) up to the point E, the communicating valve (6 and 18) closes and the expansion takes place up to the volumetric maximum F produced by the engine; and then the exhaust valve (5 and 17) opens, allowing the gases FG to escape. In the subsequent stage of renewing the fuel charge, two cases are to be considered:

1. For the two-stroke reciprocating piston engine (FIG. 1) the exhaust valve 5 opens at F and the inlet valve 4 at G; these two valves remain open until B in order to allow scavenging of the engine by means of a source of external rotating air (blower). At B, these valves close and the cycle begins again.

There can be seen, in the diagram of FIG. 3 the fundamental advantage of associating an expansion ratio greater than the compression ratio with combustion at constant pressure. The work done is BJFA, the value of which is very considerable.

On the other hand, it will be noted that in the case of the two-stroke cycle full use is made of the stroke since DF represents the combustion and the extended expansion, AB the scavenging, BD the compression and the transfer. This rational use of the stroke together with the work capacity at each revolution and the low thermal charge, gives this solution a special place for high specific powers.

2. For the four-stroke rotary engine (FIG. 2) a half revolution of the rotor is used for expelling the burnt gases GH to the outside and drawing in fresh air HA; The cycle is then terminated. In this case, the part of the cycle AB is not used as in the two-stroke cycle but the loss of specific power which results is compensated for by the great compactness of this type of engine.

FIG. 3 shows the PV diagrams for four powers corresponding to richnesses of one-eighth, one-fourth, three-eighths and one-half. If the communicating or transfer valve is not adjustable during running, it opens at the same point of the cycle for all charges (vertical C) and closes at the same point of the cycle for all charges (vertical E).

If one chooses the adjustment point C3, there is, by definition, at this point, equality, on opening, between the pressure in the compression chamber and in the combustion chamber for the other points C1, C2, C4 this equality does not exist and a transfer loss exists represented by the cross-hatched areas; this loss is slight at 50 percent of the charge, zero at 75 percent, very slight at 100 percent, it is from approximately 15 to 25 percent of the charge but it contributes to maintaining a minimum compression temperature which is that of C3 and which ensures uniform combustion.

For a chosen constant point of closure E1, E2, E3, E4, the volume of the expansion chamber (1 and 20) is fixed, the weights of air and fuel occupy a greater volume than that of the air at the end of compression since the gases are hot and expanded by combustion. If the volume of the expansion chamber is sufficient, the weight of gas removed is equal to the weight of air previously compressed, increased by the weight of the fuel. Due to this, the pressure in the combustion chamber (7 and 21) remains constant. If this volume is too small, gas is stored in the combustion chamber, the pressure increases from one cycle to the other until the weight of gas admitted into the expansion chamber is equal to that of the compressed air increased by the weight of the fuel: the equilibrium is thus restored. If this volume is too great, the pressure in the combustion chamber drops. Thus, the pressure support automatically increases with the level of fuel, which is an extremely favourable factor for conserving the output of the charge. As an example, for RVC=7 the thermal output is 0.53; 0.54; 0.55; 0.55 respectively for richnesses of one-eighth; one-fourth; three-eighths; and one-half.

It will be noted that the control of the closing point B is an important means for varying the pressure ratio; this adjustment may be used in certain engines and certain applications in connection with the control of the level of fluid.

The starting of the engine takes place simply by rotating it with a low speed member, the intake and compression of the gas taking place up to the pressure of the point C3. The temperature in the combustion chamber is thus sufficient for the introduction of the fuel, with a temporary hot point (spark device), to bring about combustion and normal running.

It will be noted that the engine operation makes it possible to produce, in succession, at the communicating valve (6 and 18), a phase for the delivery of compressed air at 350°C and a phase for the readmission of burnt gases at 1,400°C. Due to this alternation, a valve temperature never exceeding 650°C results, which is a fundamental condition for good operation.

On the other hand, since there is only one communicating valve, it may have considerable dimensions and thus reduce the pumping losses during the transfer. The arrangements adopted keep the transfer speeds at between 20 and 30 m/s. The fact that this valve opens and closes only once per cycle substantially increases its active life.

Due to the canalisation of the communicating valve, it is necessary to organise the circulation of fluid downstream of this valve in order to produce the desired circuit.

Figure 4:
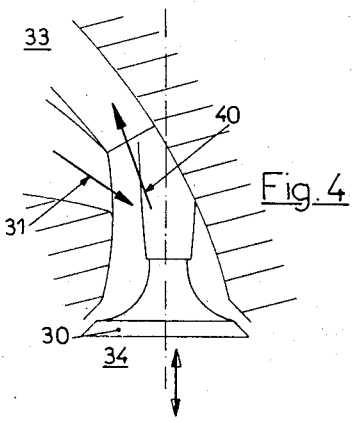
FIGS. 4, 5, 6, 7 and 8 show three possible variations for the construction of the transfer valve of the combustion chamber.

In FIG. 4, the communicating valve is shown in a simple form and producing the separation of the air delivered (arrow 40) and the gases readmitted (arrow 31) solely by the effect of dynamic orientation as shown in FIG. 4 where the valve has the reference 32, between the separate combustion chamber 33 and the variable volume 34 of the cylinder or stator chamber.

Figure 5:
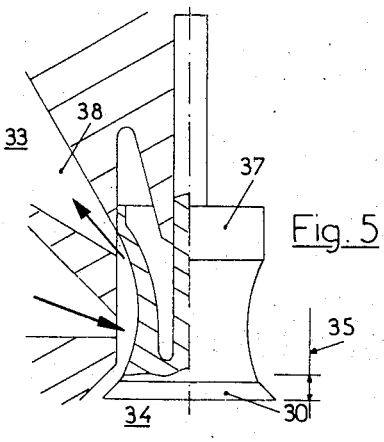
Figure 6:
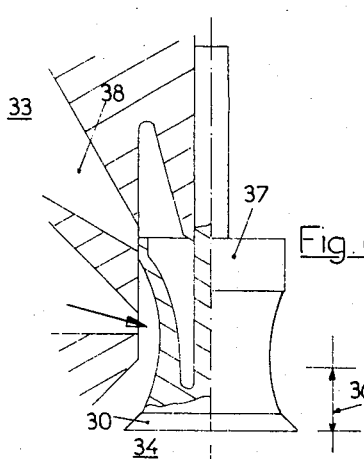
Figure 9:
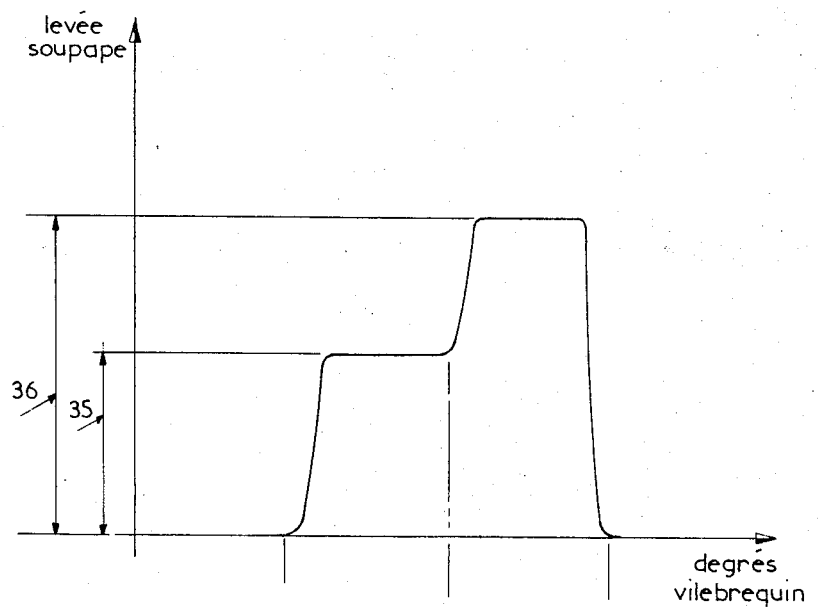
FIG. 9 is a distribution diagram showing the law of valve lift, for the two valve variations of FIG. 5 and FIGS. 6 and 7 and 8 respectively.

One may seek a more positive manner of enforcing this separation of the air and gases by using the valve as a mobile deflector, during the delivery of compressed air by means of a valve lift 35 which is smaller during the delivery of air than at the time of the readmission of gases (lift 36). On the other hand, there is produced a dynamic blocking of the air outside the readmission phase by means of a standard fluid logic system. FIGS. 5 and 6 show a possible embodiment of this proposal (diagram of FIG. 9) in which the gas circuit is placed against the wall of the engine. The association of a blockage on the outward journey by means of a variable lift of the valve and a dynamic blocking phenomenon on the return is very effective. The blocking is effected in this case on the air circuit by a mask 37 of the valve 30, which masks the air channel 38 during the incomplete lift 35 (FIGS. 5 and 9).

Figure 7:
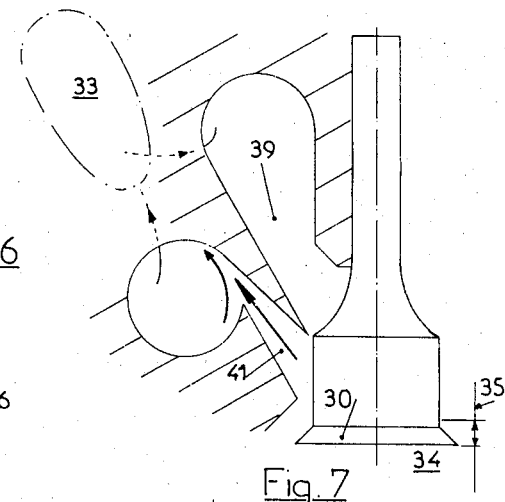
Figure 8:
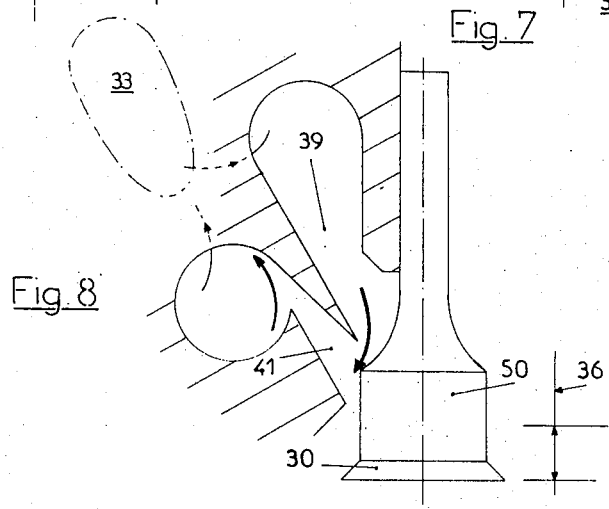

In the variation of FIGS. 7 and 8, the gas circuit 39 is placed against the stem of the valve 30. Here, the mask 50 of the valve 30 blocks the gas channel 39 during the transfer of air through the channel 41 towards the chamber 33 (incomplete lift 35, FIG. 7). Then, (FIG. 8, complete lift 36), the channel 39 opens for the removal of the gases.

The operating flexibility of such an engine is considerable and similar to a reciprocating steam engine. The engine can operate from the lower limit of stability of the spark, i.e., about 100T/mn without detonation or pre-ignition up to the admissible limit for pumping losses which can be situated at about 8,000 T/m under present conditions.

The engine torque is maximum at low speed since it is possible, at low speed, for the same maximum temperature of the hot parts to tolerate a greater richness this factor having a direct consequence on the flexibility of use.

The fuels used may be very varied and there is no necessity to provide them with anti-detonating additives in particular lead derivatives.

The pollution due to exhaust gases is considerably reduced by the long duration of combustion the low maximum combustion temperature, the considerable excess of air, the absence of cold walls in the combustion zone and the use of lead-free fuels.

This reduction of pollution affects carbon monoxide, nitrogen oxide and dioxide and residual hydrocarbons.

Figure 10:
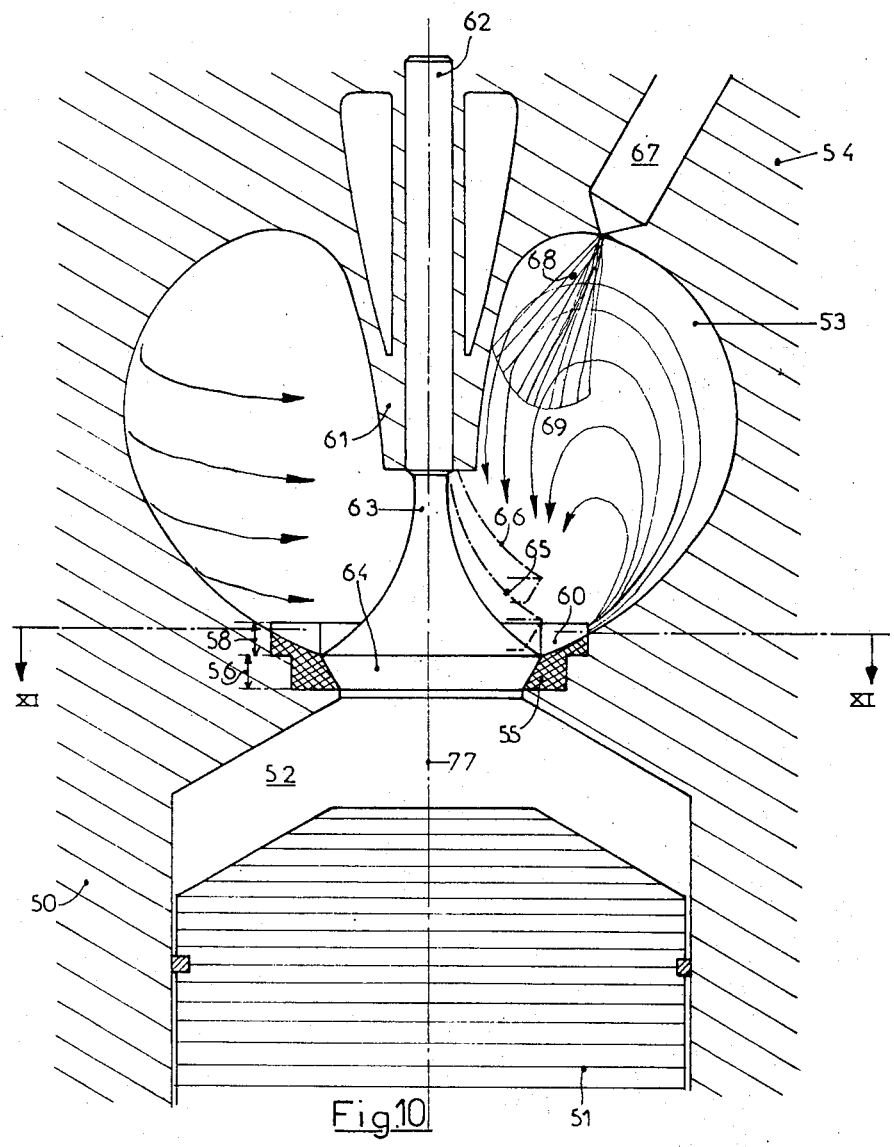
FIG. 10 is an axial section of another combustion chamber according to the invention provided in a reciprocating piston engine.
Figure 12:
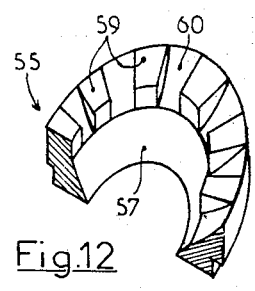
FIG. 12 is a perspective partial sectional view of an annular valve seat.
Figure 11:
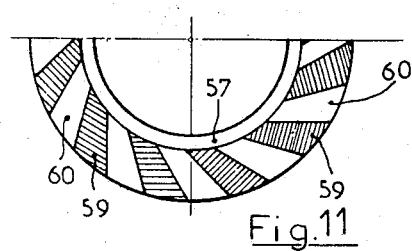
FIG. 11 is a section on the line XI—XI of FIG. 10.

FIGS. 10 to 12 show an engine cylinder 50 inside which there moves a reciprocating piston 51. In the cylinder volume 52, the admission of fresh gases and the removal of burnt gases take place in the normal manner, for example through valves which are not shown.

The combustion chamber 53 according to the invention is housed inside the cylinder head 54 of the engine. It is connected to the cylinder interior 52 by an annular valve seat 55 comprising two superimposed zones; namely:

a first air-tight zone 56 corresponding to an inner frusto-conical face 57 which converges towards the geometric axis 47 in the direction of the piston 51;

a second turbulence zone 58 comprising a ring of tangential ribs 59 arranged to alternate with equally tangential channels 60.

Overall the chamber 53 has a substantially spherical shape, into which there extends a central boss 61, which forms opposite the seat 55, the guide bore of the stem 62 of the communicating valve 53. The tulip-shaped part 54 of this valve has a frusto-conical support face able to bear in a fluid-tight manner against the face 57.

The valve is controlled by a double-lift mechanism, i.e.:

the valve is raised as far as the position 65 at the time when the air of the cylinder interior volume has to be introduced into the chamber 53;

it is raised further to the position 66 when the burnt gases contained in the chamber 53 have to be delivered under pressure to the cylinder interior 52.

In other words:

in the position for the intake of air 65, the tulip-shaped part 54 clears the abutment face 57 of the seat 55, but it remains at the level of the zone 58, such that air penetrating the chamber 53 must pass through the channels 60 which impart a vortical motion thereto;

on the other hand, when the valve is in the discharge position 66 it uncovers to a great extent the central aperture of the seating 55 and the gases under pressure surge into it directly without being subject to any turbulence due to the channels 60.

The operation is as follows:

When the valve 64 is in the inlet position 65, the mixture of fresh gases is centrifuged whilst energetically sweeping the inner, spherical wall of the chamber 53. The turbulent flow thus rises along the wall as far as the level of the tip of the injector 67 whilst cooling the chamber 53. In addition, the gases mix in a reverse circuit (arrows 69) with the burnt gases of the chamber 53. The jet of fuel 58 sprayed by the injector 67 is incorporated with air in which it burns.

After combustion, when the valve 63 in the position 65, the gases penetrate the cylinder capacity 52 and act on the piston 51.

It can be seen that the combustion chamber according to the addition is both simple and adjustable. The adjustments take place by modifying the inclination of the channels 60, as well as the position and the characteristics of the injector 67.

What is claimed is:

1. An internal combustion engine comprising a separate combustion chamber; a variable volume chamber; a piston means in said variable volume chamber for expanding and compressing said variable volume chamber; an air intake selectively communicating with said variable volume chamber; a valve means for controlling communication between said combustion chamber and said variable volume chamber, said valve means closing communication between said chambers while said piston means initially compresses said variable volume chamber and air is communicated to said variable volume chamber, and opening communication between said chambers during compression of said variable volume chamber after communication between said air intake and variable volume chamber is closed and the pressure in said chambers are equal, the air in said variable volume chamber being communicated to said combustion chamber during further compression of said variable volume chamber; means for communicating fuel to said combustion chamber and igniting same, said ignited fuel communicating through said valve means with said variable volume chamber to expand same, said valve means closing said communication between said chambers before said variable volume chamber is expanded to a maximum amount, the pressure in said combustion chamber remaining constant throughout a cycle of said engine.

2. The internal combustion engine defined in claim 1, wherein the volumetric ratio of expansion is greater than the volumetric ratio of compression.

3. The internal combustion engine defined in claim 1, wherein said internal combustion engine is of the reciprocating piston type.

4. The internal combustion engine defined in claim 1, wherein said internal combustion engine is of the rotary piston type operating in a four stroke cycle.

5. The internal combustion engine defined in claim 1, wherein said combustion chamber further comprises an inner sleeve of refractory steel which channels the air delivered through said valve means from said variable volume chamber to make the air follow the walls of said combustion chamber and mix with the fuel injected into said combustion chamber from said fuel communicating means.

6. The internal combustion engine defined in claim 1, in which the separate combustion chamber comprises walls cooled by circulating engine water.

7. The internal combustion engine defined in claim 5, wherein said channel defined by said inner sleeve of refractory steel is so positioned with respect to said valve means that air delivered through said valve means from said variable volume chamber is directed to said channels; said combustion chamber being so positioned with respect to said valve means that the fuel ignited in said combustion chamber is delivered to said variable volume chamber through said valve means.

8. The internal combustion engine defined in claim 5, wherein said valve means is provided with a fluid sealing surface, said valve means being in a first position wherein said sealing surface engages said channels to prevent communication between said channels and said variable volume chamber while permitting communication between said combustion chamber and said variable volume chamber, said valve means being movable to a second position wherein said channels are in communication with said variable volume chamber and air is delivered from said variable volume chamber to said channels.

9. The internal combustion engine defined in claim 5, wherein said valve means has a fluid sealing surface thereon, said valve means being movable to a first position wherein said sealing surface prevents communication between said combustion chamber and said variable volume chamber while air is delivered to said channels, said valve means being movable to a second position wherein said ignited fuels are delivered through said valve means to said variable volume chamber.

10. The internal combustion engine defined in claim 1, wherein said means for communicating fuel to said combustion chamber is a fuel injector supplied by a constant pressure pump to produce a continuous injection, its opening being controlled by the acceleration control of the engine and limited by a speedometer abutment.

11. The internal combustion engine defined in claim 1, wherein said means for communicating fuel to said combustion chamber is of the impulse type supplied by standard mechanical injection pump controlled by the acceleration control of said internal combustion engine.

12. The internal combustion engine defined in claim 1 further comprising an internal boss defining a guide bore; said valve means comprising a stem reciprocally mounted in said guide bore and having a valve seat on the other end of said stem adapted to bear in a fluid type relationship with an annular seat formed opposite said central boss and communicating said variable volume chamber with said combustion chamber; said combustion chamber being substantially spherical in shape with the exception of said internal boss defining said guide bore.

13. The internal combustion engine defined in claim 12 in which the opening defined by said valve seat is opened to communicate fluid between said chambers by the moving of said valve inside said combustion chamber relative to said valve seat.

14. The internal combustion engine defined in claim 12, wherein said means for communicating fuel to said combustion chamber comprises a fuel injector extending into said combustion chamber opposite said valve seat near the base of said central boss, the axis of said injector being inclined with respect to the axis of said valve stem and in the direction of the center of said valve seat.

15. The internal combustion engine defined in claim 12 in which said valve means formed on the end of said valve stem has a fluid sealing surface; said valve seat comprising two concentric annular zones, a first lower zone closest to said variable volume chamber having a fluid sealing surface engageable by said fluid sealing surface of said valve member to close fluid communication between said chambers, said second annular zone having a plurality of tangentially shaped channels extending from said internal combustion chamber to said opening of said valve seat, said valve sealing surface being movable from said sealing engagement to a second position wherein the flow of fluid between said chambers is through said tangental channels; said valve member fluid sealing surface being moved to a third position above said valve seat to permit direct fluid communication between said chambers.

16. The internal combustion engine defined in claim 15, wherein said valve member is moved to said second position when air is being delivered from said variable volume chamber to said combustion chamber; said valve member being moved to said third position to provide unrestricted communication between said chambers at the time said ignited fuel is ejected from said combustion chamber to said variable volume chamber.

* * * * *

UNITED STATES PATENT OFFICE
CERTIFICATE OF CORRECTION

Patent No. 3,809,030　　　　　　　　　　Dated May 7, 1974

Inventor(s) Auguste MOIROUX

It is certified that error appears in the above-identified patent and that said Letters Patent are hereby corrected as shown below:

Column 2, lines 26, 27, after "the" delete "accompanyings" and insert --accompanying drawings--. Column 6, line 34, after "valve" delete "53" and insert --63--; line 35, after "part" delete "54" and insert --64--; line 67, after "fuel" delete "58" and insert --68--. Column 7, line 2, the beginning of the line, delete "65" and insert --66--.

Signed and sealed this 27th day of May 1975.

(SEAL)
Attest:

RUTH C. MASON
Attesting Officer

C. MARSHALL DANN
Commissioner of Patents
and Trademarks